United States Patent
Khazhinsky et al.

(10) Patent No.: US 9,806,521 B2
(45) Date of Patent: Oct. 31, 2017

(54) ELECTROSTATIC DISCHARGE PROTECTION FOR A TRANSFORMER BALUN

(71) Applicant: Silicon Laboratories Inc., Austin, TX (US)

(72) Inventors: Michael G. Khazhinsky, Austin, TX (US); Ravi K. Kummaraguntla, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 349 days.

(21) Appl. No.: 14/527,205

(22) Filed: Oct. 29, 2014

(65) Prior Publication Data

US 2016/0126725 A1    May 5, 2016

(51) Int. Cl.
  *H02H 9/04*   (2006.01)
  *H02H 3/20*   (2006.01)
  *H02H 3/02*   (2006.01)

(52) U.S. Cl.
  CPC .............. *H02H 9/046* (2013.01); *H02H 9/04* (2013.01); *H02H 3/02* (2013.01); *H02H 3/202* (2013.01)

(58) Field of Classification Search
  CPC   H02H 9/04; H02H 9/046; H02H 3/20; H02H 3/202
  See application file for complete search history.

(56) References Cited

U.S. PATENT DOCUMENTS

| | | | |
|---|---|---|---|
| 7,009,308 B1 | 3/2006 | Jin et al. | |
| 7,010,279 B2 | 3/2006 | Rofougaran | |
| 7,391,596 B2 | 6/2008 | Khorram | |
| 8,576,026 B2 | 11/2013 | Liu et al. | |
| 2004/0102175 A1* | 5/2004 | Rofougaran | H01L 27/0251 455/323 |
| 2007/0080736 A1 | 4/2007 | Castaneda | |
| 2007/0152770 A1 | 7/2007 | Mondal | |
| 2007/0165345 A1* | 7/2007 | Woo | G06F 1/266 361/56 |

(Continued)

OTHER PUBLICATIONS

Wang, H., et al. "A low-power ESD-protected 24 GHz receiver front-end with π-type input matching network," IEEE International Symposium on Circuits and Systems (ISCAS), May 15-18, 2011, pp. 2877-2880

(Continued)

*Primary Examiner* — Zeev V Kitov
(74) *Attorney, Agent, or Firm* — Zagorin Cave LLP

(57) ABSTRACT

A balun includes an input coil and an output coil with first and second outputs that vary during normal operation. The output coil has a center point connection that remains substantially constant during normal operation. An ESD circuit provides a low impedance path between the center point connection and chip ground when the voltage at the center point connection is above a first threshold voltage or below a second threshold voltage and isolates the center point connection from chip ground otherwise. Another ESD protection circuit provides ESD protection for other input or output terminals of the integrated circuit by selectively coupling the other input or output terminals to chip ground. Thus, a charge that builds up between one of the balun outputs and another terminal on the integrated circuit can be safely dissipated.

20 Claims, 5 Drawing Sheets

(56) References Cited

U.S. PATENT DOCUMENTS

| | | | |
|---|---|---|---|
| 2009/0096532 A1 | 4/2009 | El Rai | |
| 2009/0161281 A1* | 6/2009 | Maggiolino | ............ H02H 9/04 |
| | | | 361/111 |
| 2010/0033253 A1 | 2/2010 | Narathong et al. | |
| 2010/0283700 A1 | 11/2010 | Rajanish et al. | |
| 2011/0098009 A1 | 4/2011 | Marholev et al. | |
| 2011/0215880 A1 | 9/2011 | Roufoogaran | |
| 2011/0298051 A1 | 12/2011 | Khieu et al. | |
| 2016/0241024 A1 | 8/2016 | Dupuis et al. | |

OTHER PUBLICATIONS

Mak, Pui-In, et al., "An open-source-input, ultra-wideband LNA with mixed-voltage ESD protection for full=band (17-to-1700 MHz) mobile TV tuners," IEEE International Symposium on Circuits and Systems, (ISCAS), May 18-21, 2008, pp. 668-671.

Yu, Tiku and Rebeiz, G.M., "A 4-channel 24-27 GHz CMOS differential phased-array receiver," IEEE Radio Frequency Integrated Circuits Symposium, (RFIC), Jun. 7-9, 2009, pp. 455-458

Ker, Ming-Dou and Hsiao, Yuan-Wen, "ESD Protection Design With Low-Capacitance Consideration for High-Speed/High-Frequency I/O Interfaces in Integrated Circuits," Recent Patents on Engineering 2007, pp. 131-145.

\* cited by examiner

ELECTROSTATIC DISCHARGE PROTECTION FOR A TRANSFORMER BALUN

BACKGROUND

Field of the Invention

This invention relates to electrostatic discharge (ESD) and improved ESD protection.

Description of the Related Art

FIG. 1 illustrates a portion of a radio frequency (RF) system that includes an integrated circuit 101 with an output stage 103 and a balun 105. Bond wires 107 couple the balun to an antenna 109. Baluns may be used to convert single-ended signals into differential signals or differential signals into single ended signals. Baluns may also be used to reject even harmonics and as band-select filters. In the example of FIG. 1, the balun comprises a transformer that includes an input coil 115 and an output coil 117. The number of turns in the illustrated RF system is the same in each coil although the ratio of turns in each coil can be different according to system requirements.

Integrated circuits with baluns, due to the isolation of the baluns, do not provide a robust electrostatic discharge to input/output terminals (pins) on chip. Conventional ESD protection circuits operate at frequencies comparable with normal balun operation and can interfere with balun operation. Thus, a conventional ESD protection circuit will respond to balun voltage/current swings as if it was an ESD event and will clamp to ground. That is undesirable since it will result in excessive leakage to ground during normal operation and possibly power loss.

The bond wires 107 include an inductance that provides impedance at high frequencies. Large voltage swings occur on terminals 108 and 110 as part of normal operation, e.g., a voltage swing of between −2 and +2 volts. The signals on terminals 108 and 110 are supplied to front-end module (FEM) 112, which in turn drives antenna 109. Typically, an FEM includes an input matching network to match the impedance to the driver power amplifier (PA), and/or includes another PA to get more power gain, and/or another low noise amplifier (LNA) to improve the noise figure of the received signal, and/or a matching network to match to the antenna 109.

Referring to FIG. 2, the positive output pad (Pad_outp) 201 supplies the positive signal to output terminal 203 through a bondwire 205 and the output pad (Pad_outn) 207 supplies the negative signal to output terminal 211 through bondwire 209. There is no built-in ESD path between the positive output (outp) 203 (or the negative output (outn) 211) and another input or output terminal on the integrated circuit shown as in/outx 215, which is coupled to integrated circuit 101 through bondwire 217 and PadX 219, and which is shown as an input/output terminal for generality. If outp (outn) is ESD stressed relative to in/outx, a large voltage will build between pins and an uncontrolled spark discharge 218 will occur as shown in FIG. 2 between outp and the relative ground 216 for the discharge event at in/outx. Since there is no safe place for the energy to be dissipated, the discharge will lead to damage to internal components. Because the balun has large positive and negative voltage swings on output pins during normal operation, an ESD protection network cannot be connected directly at the pins driven by the balun to provide protection. Thus, improved ESD protection is needed for baluns.

SUMMARY OF EMBODIMENTS OF THE INVENTION

Accordingly, in one embodiment, an apparatus is provided that includes a balun having an input coil and an output coil with a center point connection. An ESD circuit is configured to couple the center point connection to a reference voltage node through the ESD circuit in response to a voltage at the center point being above a first threshold voltage. The ESD circuit isolates the center point connection from the reference voltage node in response to the voltage at the center point being below the first threshold voltage.

In another embodiment, a method of providing electrostatic discharge protection for a balun includes providing a low impedance path to a reference voltage node for the output coil from the center connection, in response to a voltage of a center connection of an output coil of the balun going above or below respective first and second threshold voltages.

In another embodiment, an apparatus includes a balun including an input coil and an output coil having a center point connection and a first and second connection of the output coil coupled respectively to first and second output pads. An electrostatic discharge (ESD) circuit is coupled at a first node to the center point connection and is coupled at a second node to a reference voltage node, e.g., ground. The ESD circuit is responsive to a voltage at the center point being above or below respective first and second threshold voltages to provide a low impedance path from the center point connection to the reference voltage node through the ESD circuit. When the voltage at the center point is below the first voltage and above the second voltage the center point connection is isolated from the reference voltage node by the ESD circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 3A:
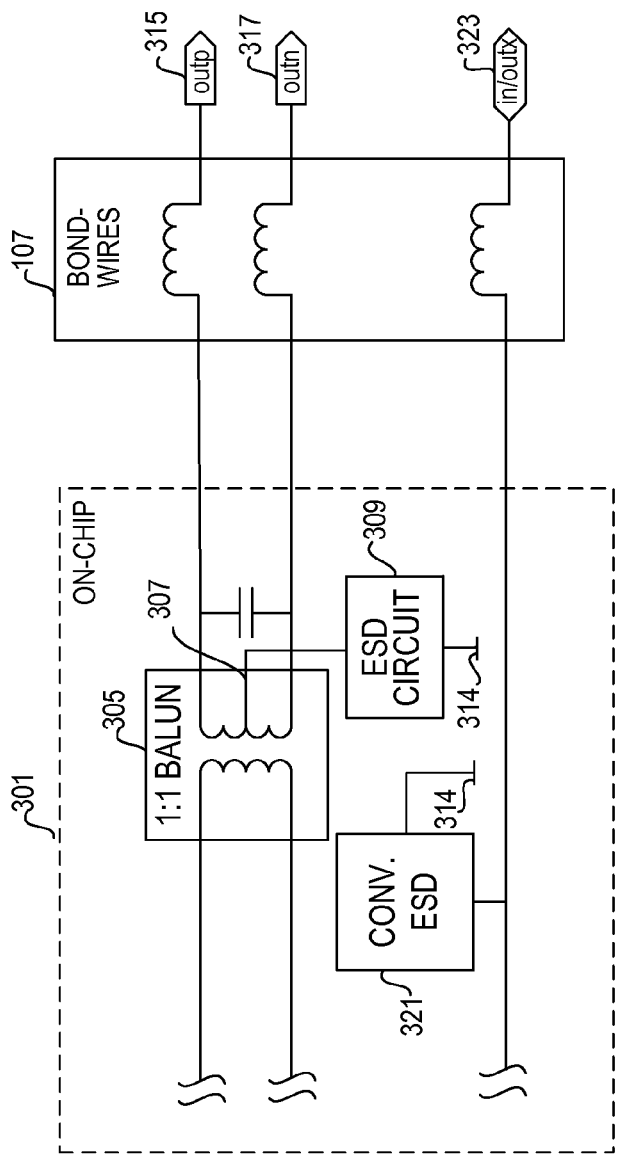
FIG. 3A illustrates an embodiment including a center connection used to provide ESD protection for the balun pins.

Referring to FIG. 3A an embodiment providing ESD protection for a balun is illustrated. The embodiment in FIG.

3A includes an integrated circuit 301 that includes a balun 305. The illustrated balun is in a fully differential configuration. A center point connection 307 is immune from large voltage swings during normal operation and can be coupled to a reference voltage, e.g., integrated circuit ground, through an ESD protection circuit 309. In the embodiment illustrated in FIG. 3B, the ESD circuit 309 includes a first diode 310 configured to allow current to flow in a first direction and a second diode 312 configured to allow current to flow in the reverse direction. Thus, the configuration may be referred to as anti-parallel. Note that although only a single diode 310 is shown for convenience, the diode 310 represents a suitable number of serially connected diodes so an appropriate diode drop is achieved before the diode string 310 turns on. The diode 310 turns on when the center point voltage drops below a negative threshold voltage to forward bias the diode(s) 310. For example, the negative threshold voltage may be −1 to −2 V. Similarly, for diode 312, although only a single diode 312 is shown for convenience, the diode 312 represents a suitable number of serially connected diodes so an appropriate diode drop is achieved before the diode 312 turns on. The diode(s) 312 turn on when the center point voltage rises above a positive threshold voltage to forward bias the diode(s) 312. For example, the positive threshold voltage may be 1-2 V. The particular positive and negative threshold voltages used depend on the particular system implementation.

Figure 3C:
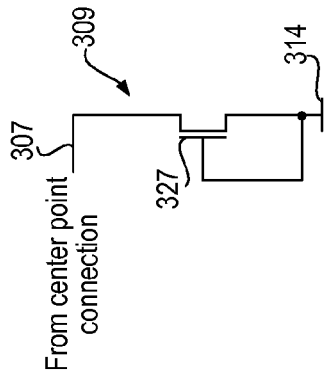
FIG. 3C illustrates an embodiment where the ESD circuit is implemented using a snapback transistor.
Figure 3B:
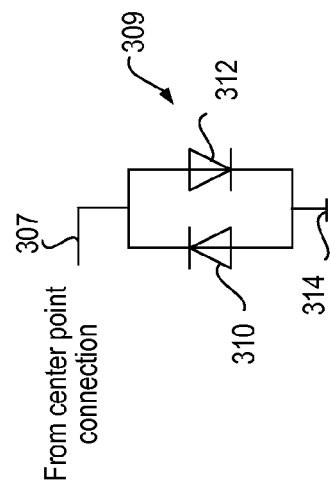
FIG. 3B illustrates an embodiment where the ESD circuit is implemented using anti-parallel diodes.

During normal operation, the ESD circuit 309 isolates the balun 305 from ground and the rest of the system because the diodes remain in the off state. When one of the diode(s) 310 or 312 turns on in response to an ESD event, the center point 307 of the output coil is coupled to a suitable reference voltage shown as ground 314 in the illustrated embodiment through a low impedance path through the diode circuit. While the ESD circuit 309 is shown in FIG. 3B as a diode circuit, FIG. 3C illustrates a level-triggered embodiment in which the ESD circuit 309 is implemented using a snapback transistor. In the embodiment illustrated in FIG. 3C transistor 327 is a grounded gate NMOS transistor. In operation, when an ESD event occurs, the NMOS transistor 327 enters bipolar operation during which voltage across the device collapses and high current is conducted both along the surface and in the bulk. In this mode NMOS transistor 327 provides a low resistance path between the center point 307 and the ground 314 and otherwise, with no ESD event, transistor 327 isolates the center point 307 from ground 314. While several embodiments of the ESD circuit 309 have been illustrated, other suitable circuits may be utilized that respond to the positive and negative threshold voltages to couple the center point of the balun to the reference voltage to thereby prevent an ESD event from resulting in damage.

Figure 4:
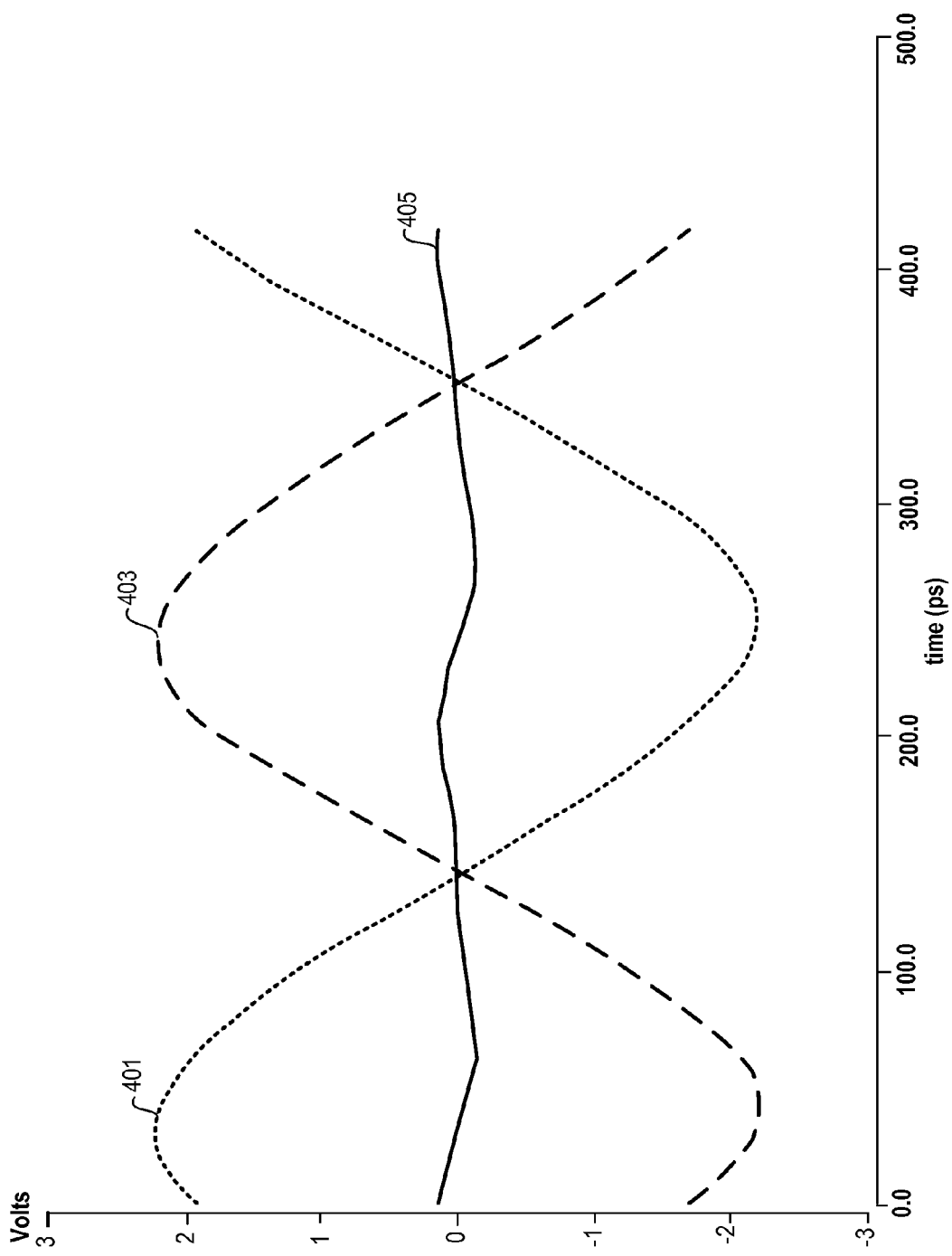
FIG. 4 illustrates voltage waveforms associated with the positive and negative output pads coupled to the balun and the center connection.

FIG. 4 illustrates normal operation of the balun. The curve 401 represents the voltage at output terminal outp 315. The curve 403 represents the voltage at output terminal outn 317. The voltages can be seen to be differential. The voltage 405 at the center point 307 can be seen to be relatively constant and close to zero volts. While the center point voltage in the illustrated embodiment fluctuates, it can be seen to remain within several tenths of volts of zero volts. In contrast, the fluctuations at output terminals outp and outn can be seen to be from approximately +2 to −2 volts and thus are approximately an order of magnitude greater than the voltage fluctuations for the center point. If the center point voltage reaches, e.g., ±1-2 V, which would result from an ESD event and not normal operation, the ESD circuit 309 (see FIG. 3A) would turn on to provide protection from the ESD event. Note that the particular voltage values given are illustrative to give an appreciation of system operation. The particular threshold voltages used to turn on the ESD circuit 309 for any particular system will depend on the ESD environment in which the system operates as compared to normal operation.

FIG. 3A also shows a conventional ESD circuit 321 coupled to an exemplary chip terminal 323 to provide ESD protection for terminals (pins) of the integrated circuit 301 other than the balun terminals. The ESD circuit can use conventional ESD clamps so that overvoltage conditions can be suitably dealt with by providing a low impedance path to ground 314 or to another suitable reference voltage.

Figure 1:
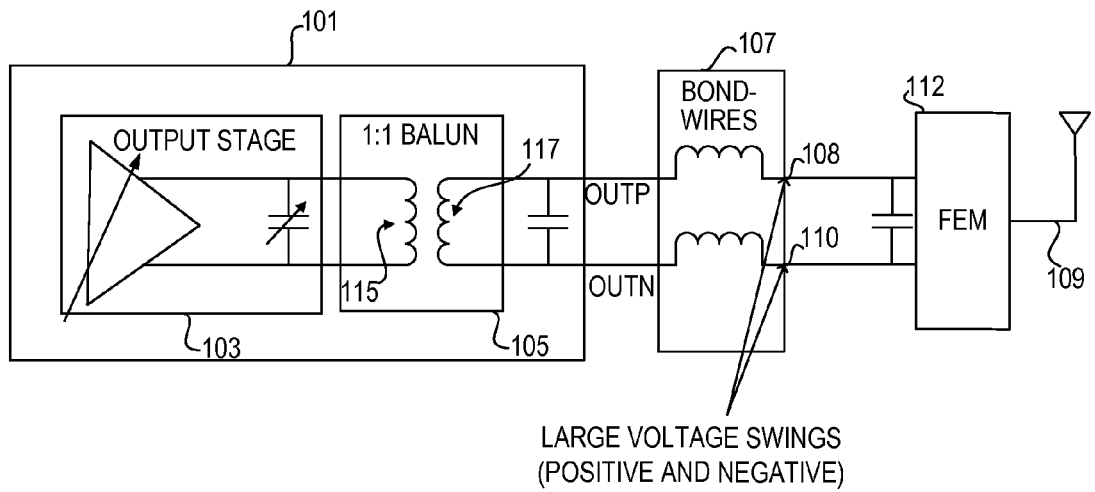
FIG. 1 illustrates a prior art RF circuit including a balun.
Figure 2:
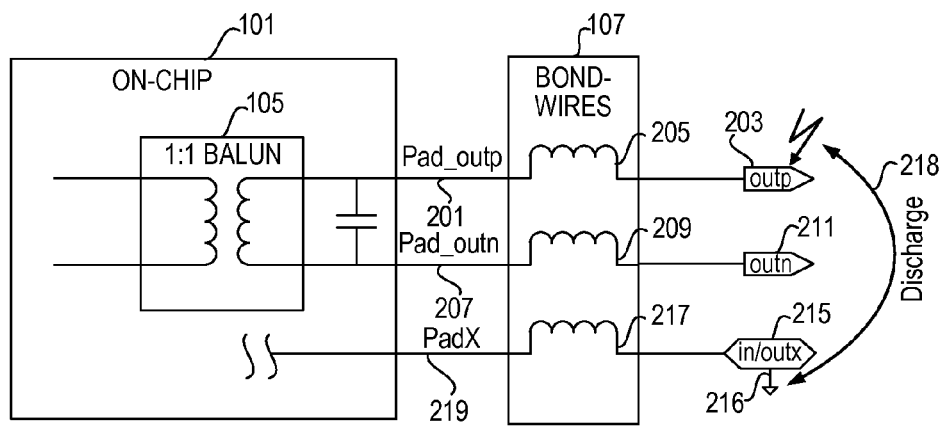
FIG. 2 illustrates an electrostatic discharge that can occur between a pin associated with the balun and another pin on the chip.
Figure 5:
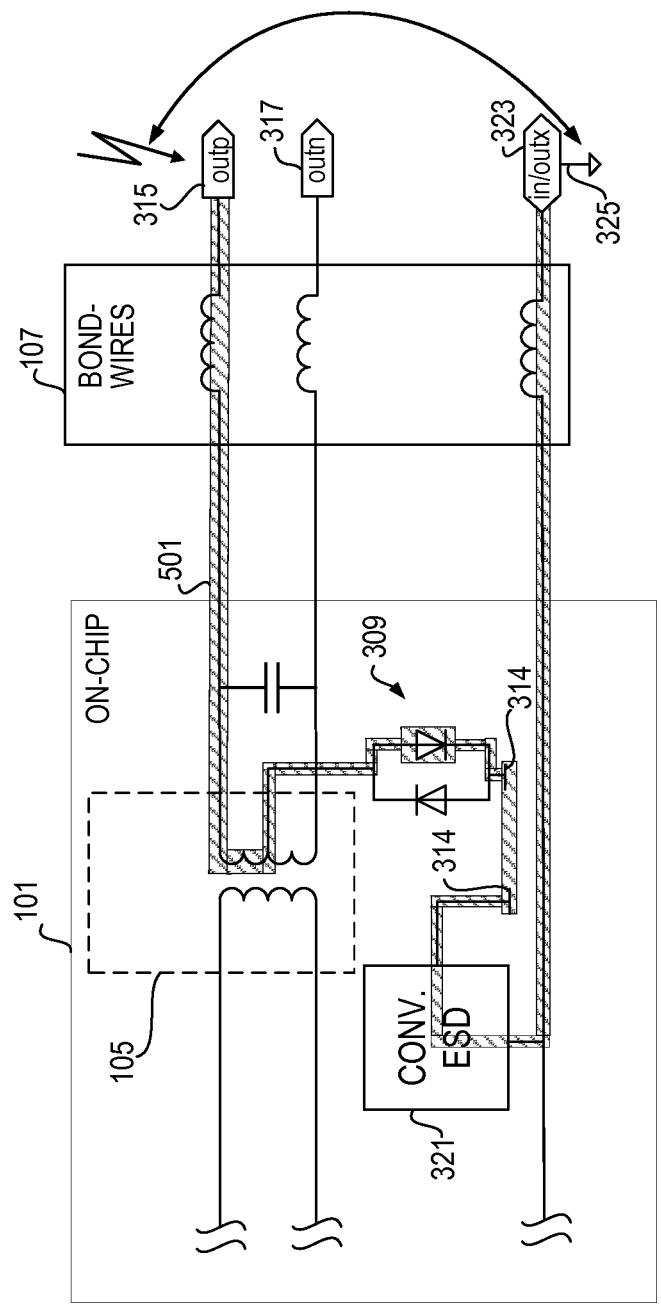
FIG. 5 illustrates operation of the embodiment of FIG. 3 in response to an ESD event.

FIG. 5 illustrates operation of the ESD protection scheme according to an embodiment. If outp 315 (or outn 317) is stressed relative to in/outx 323, a full ESD protection path shown by the shaded region 501 is provided by ESD circuit 309 coupling outp to ground 314 and by ESD protection circuit 321 providing a path to ground 314 for in/outx. As in FIG. 2, the terminal 323 provides relative ground 325 for the ESD event. With the ESD protection path provided, any ESD stress that develops between outp (outn) and in/outx 323 can be safely dissipated through the path 501.

Figure 6:
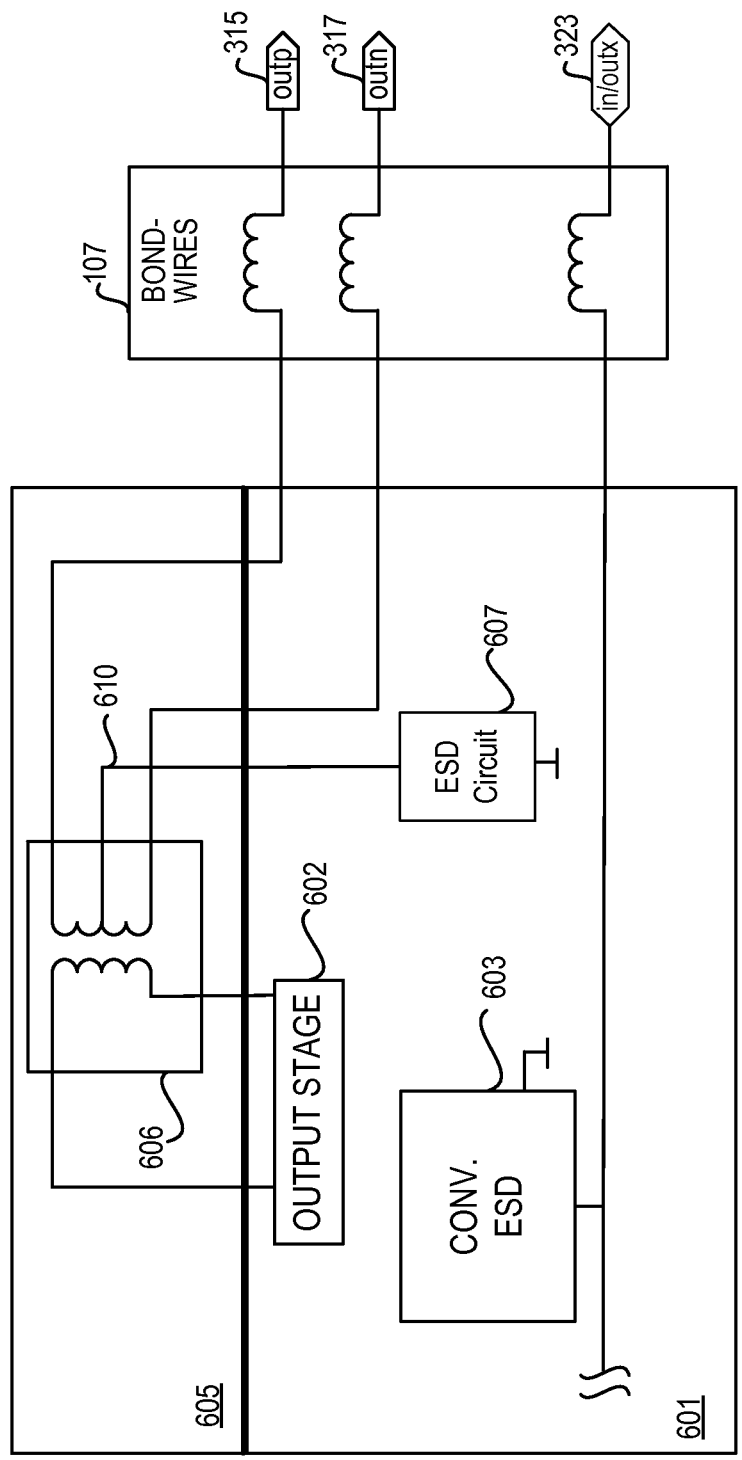
FIG. 6 illustrates an embodiment where the balun is formed outside of the integrated circuit on which the balun diode circuit and conventional ESD circuit are disposed.

While FIG. 3A contemplates the balun 305 being disposed in integrated circuit 301, FIG. 6 illustrates another embodiment in which the output stage 602, conventional ESD circuit 603 and the ESD circuit 607 is formed on integrated circuit 601, while the off-chip balun 606 is formed on a separate die 605 or otherwise formed separately from integrated circuit 601, e.g., as an integrated passive device. The ESD circuit 607 may be implemented as shown in FIG. 3B or 3C or as any other suitable ESD circuit. In the embodiment illustrated in FIG. 6, the off-chip balun is coupled to integrated circuit 601. The off-chip balun may be mechanically coupled, e.g., by bonding in a stacked configuration and electrically coupled through vias formed in the integrated passive device 605 and integrated circuit 601. As shown in the illustrated embodiment, the output stage 602 supplies the off-chip balun 606 and the output coil of the balun is coupled to integrated circuit 601. The center tap 610 from balun 606 is supplied to ESD circuit 607, through, e.g., vias formed appropriately in the integrated circuit dies. In other embodiments, the output from the off-chip balun may be coupled to an antenna without returning to the integrated circuit 601.

Thus, various aspects have been described relating ESD protection for a balun. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. An apparatus comprising:
   an input coil and an output coil having a center point connection, the input coil and the output coil forming a balun; and
   an electrostatic discharge (ESD) circuit configured to couple the center point connection to a reference voltage node through the ESD circuit responsive to a voltage at the center point connection being above a first threshold voltage and the ESD circuit is responsive to isolate the center point connection from the reference voltage node responsive to the voltage at the center point connection being below the first threshold voltage and above a second threshold voltage;

wherein ESD circuit is further configured to couple the center point connection to the reference voltage node through a first circuit responsive to the voltage at the center point connection being below the second threshold voltage;
wherein the voltage at the center point connection varies but is substantially stable during normal operation as compared to positive and negative outputs of the balun and the voltage at the center point connection remains within several tenths of volts of zero volts during normal operation.

2. The apparatus as recited in claim 1 wherein the reference voltage node is a ground node.

3. The apparatus as recited in claim 1 wherein the ESD circuit comprises at least first and second diodes in an antiparallel configuration to thereby provide a low impedance path from the center point connection, through one of the first and second diodes, to the reference voltage node in response to the voltage at the center point connection being above the first threshold voltage or the voltage at the center point connection being below the second threshold voltage.

4. The apparatus as recited in claim 1, wherein the balun is disposed in an integrated circuit.

5. The apparatus as recited in claim 4 further comprising a second electrostatic discharge (ESD) circuit coupled to terminals of the integrated circuit separate from the balun and the second ESD circuit is coupled to the reference voltage node.

6. The apparatus as recited in claim 5 further comprising:
a first and second output pad coupled to the balun;
a third output pad coupled to circuits in the integrated circuit and coupled to the second ESD circuit.

7. The apparatus as recited in claim 1 wherein the input coil and output coil forming the balun are formed separately from an integrated circuit on which the ESD circuit is disposed.

8. A method of providing electrostatic discharge protection for a balun comprising:
supplying a differential signal from an output coil of a balun having a center point connection that fluctuates during normal operation but remains within several tenths of volts of zero volts during normal operation; and
responsive to a voltage of the center point connection of the output coil of the balun going above or below respective first and second threshold voltages, providing a low impedance path to a reference voltage node for the output coil from the center point connection.

9. The method as recited in claim 8 wherein the reference voltage node is ground.

10. The method as recited in claim 8 wherein providing the low impedance path comprises turning on a first portion of a diode circuit when the voltage at the center point connection of the output coil is above the first threshold voltage and turning on a second portion of the diode circuit when the voltage at the center point connection is below the second threshold voltage, to thereby provide the low impedance path to the reference voltage node.

11. The method as recited in claim 10, wherein the balun is disposed in an integrated circuit.

12. The method as recited in claim 11 further comprising providing a low impedance path to the reference voltage node for one or more input or output terminals on the integrated circuit through an electrostatic discharge (ESD) circuit coupled to the one or more input or output terminals, the ESD circuit being separate from the diode circuit.

13. The method as recited in claim 8 further comprising during normal operation the voltage of the center point connection is substantially stable as compared to first and second outputs of the output coil.

14. An apparatus comprising:
a balun including an input coil and an output coil having a center point connection and a first and second connection of the output coil coupled respectively to first and second output pads; and
a first ESD circuit coupled at a first node of the first ESD circuit to the center point connection and coupled at a second node to a reference voltage node, the first ESD circuit responsive to a voltage at the center point connection being above or below respective first and second threshold voltages to provide a low impedance path from the center point connection to the reference voltage node through the first ESD circuit and when the voltage at the center point connection is below the first threshold voltage and above the second threshold voltage the center point connection is isolated from the reference voltage node by the first ESD circuit;
wherein the voltage at the center point connection varies but is substantially stable during normal operation as compared to positive and negative outputs of the balun and the voltage at the center point connection remains within several tenths of volts of zero volts during normal operation.

15. The apparatus as recited in claim 14 wherein the reference voltage node is ground.

16. The apparatus as recited in claim 14 wherein further comprising a second electrostatic discharge (ESD) circuit coupled to provide a path between an input or output pad and the reference voltage node responsive to an ESD event including the input or output pad.

17. The apparatus as recited in claim 16 wherein the apparatus is an integrated circuit and the balun, the second ESD circuit, and the first ESD circuit are disposed on the integrated circuit.

18. The apparatus as recited in claim 16 wherein the first ESD circuit and the second ESD circuit are disposed on an integrated circuit and the balun is disposed on a separate substrate, electrically and mechanically coupled to the integrated circuit.

19. The apparatus as recited in claim 14 wherein the ESD circuit comprises a grounded gate NMOS transistor having a gate connected to ground.

20. The apparatus as recited in claim 1 wherein the ESD circuit comprises a grounded gate NMOS transistor having a gate connected to ground.

* * * * *